Sept. 7, 1926.
T. G. BAXENDEN
1,599,271
SPOOL FOR PHOTOGRAPHIC CAMERA FILMS AND SIMILAR PURPOSES
Filed Sept. 27, 1924
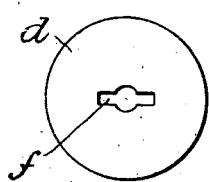
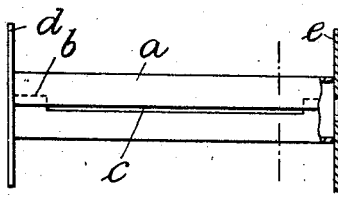
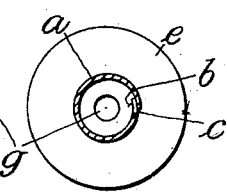
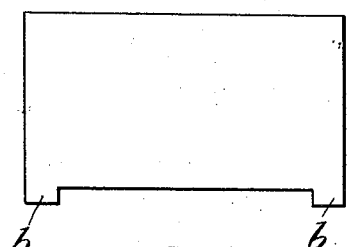
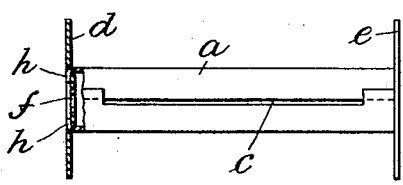
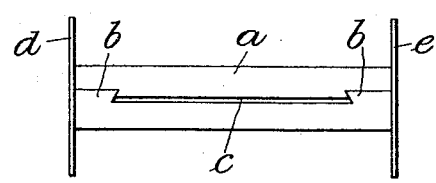
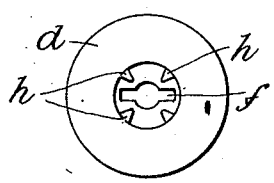
Inventor:
T. G. Baxenden,
by Wilkinson & Ginsta,
Attys.

Patented Sept. 7, 1926.

1,599,271

UNITED STATES PATENT OFFICE.

THOMAS GEORGE BAXENDEN, OF WATFORD, ENGLAND.

SPOOL FOR PHOTOGRAPHIC CAMERA FILMS AND SIMILAR PURPOSES.

Application filed September 27, 1924, Serial No. 740,288, and in Great Britain April 30, 1924.

This invention relates to spools for photographic camera films and similar purposes, and the invention has for its object to provide an improved type of spool which will be less costly to manufacture than those at present in use. For convenience of description the invention will be described as applied to spools for photographic hand cameras.

According to the present invention instead of being made of wood as hitherto the cylindrical body part of the spool is made of a metal tube, preferably rolled up or otherwise constructed from a flat metal blank or blanks, and end flanges are attached to the said cylindrical body part in any suitable manner.

The end flanges may consist of discs perforated with apertures of the required shape for receiving the winding key and pivot pin by which the spool is supported in the camera.

The said end discs will be secured to the tubular body part of the spool by welding, soldering, by ears and slots, or in any other suitable manner.

The meeting edges of the rolled up blank which forms the body part of the spool may overlap, and, if desired, one of the said edges may be cut away or recessed to provide the slot for receiving the end of the film which is to be wound on the spool.

These slots may however be provided in any other suitable manner by forming them in the blank so as to occupy the required position when the said blank is formed into a tube.

I will now describe several forms of the invention with the aid of the accompanying drawings, in which, Fig. 1 is a side view partly in section showing one form of the improved spool.

Fig. 2 is an end view of Fig. 1.

Fig. 3 is a section on line X—X of Fig. 1 looking from the left.

Fig. 4 is a plan of the blank from which the body of the spool is made.

Fig. 5 is a side view partly in section showing a modified construction.

Fig. 6 is an end view of Fig. 5.

Fig. 7 is a side view of a further modification.

Referring to Figs. 1 to 4, the cylindrical body part $a$ of the spool is in the form of a tube rolled up from a flat metal blank such as shown in Fig. 4. One edge of the said blank is cut away or recessed so as to leave end projections $b$ which when the blank is rolled up into tubular form overlaps the adjacent edge, whilst the cut away portion remains spaced apart from said edge and thus provides a slot $c$ through which the end of a film is passed when the same is to be wound upon the spool in the usual manner.

The flanges of the spool are formed by end discs $d$ and $e$ which may be attached to the body part $a$ by soldering, welding, or in any other suitable manner.

One end disc, say $d$, is perforated centrally with a slot $f$ of the usual shape for receiving the end of the usual winding key of a film camera, and the other disc $e$ is perforated with a central hole $g$ for fitting over the usual pivot pin.

Figs. 5 and 6 show a construction similar to that shown in Figs. 1 to 4 except that the ends of the tube forming the cylindrical body part $a$ are formed with ears $h$ and the end discs $d$ and $e$ which form the flanges are provided with corresponding slots through which the said ears $h$ are passed and bent over in the usual manner to secure the end discs $d$ and $e$ to the said body part $a$. The end discs may be recessed as shown, so that the turned over ears $h$ will lie flush.

Fig. 7 shows a further modification, wherein one of the meeting edges of the tube forming the body part $a$ of the spool is formed with dovetailed projections $b$ adapted to interlock with corresponding recesses in the other edge. The slot $c$ for receiving the end of the film is in this case formed by making the recess between the end projections $b$ deeper than the corresponding projection on the opposing edge.

In the construction according to Fig. 7 the joined edges of the tube forming the body part $a$ come flush with one another, and in the form shown in Figs. 1 to 6 the overlapping edges may be allowed to lie one upon the other or the overlapping parts may be forced one into the other to provide a flush or practically flush surface.

According to another construction (not illustrated) the tube forming the cylindrical body part of the spool may be made in two semicircular halves welded or otherwise joined together at their edges.

Alternatively the tubular body of the spool may be formed from a blank and have its edges curled and clipped together or joined by a double folded or milk can seam.

Instead of the central part of the end discs being cut out to receive the winding key and pivot pin, the ends of the tube forming the cylindrical body part of the spool may be turned inwards and appropriately shaped for this purpose, the end discs being in this case formed with a circular hole and flanged or not as required.

What I claim as my invention and desire to secure by Letters Patent is:—

A spool comprising a tubular body part having dovetail recesses in one edge and dovetail projections on the other edge thereof fitting into said recesses, said dovetail recesses being shallower than the depth of the projections whereby to form an elongated slot at the adjacent edges of the body part and between said projections, and end flanges attached to said body part.

THOMAS GEORGE BAXENDEN.